US008813547B2

(12) United States Patent
Cwik et al.

(10) Patent No.: US 8,813,547 B2
(45) Date of Patent: Aug. 26, 2014

(54) METHOD FOR PREDETERMINING A MOTION STATE OF A DRIVE SHAFT OF AN INTERNAL COMBUSTION ENGINE

(75) Inventors: Matthias Cwik, Stuttgart (DE); Markus Roessle, Stuttgart (DE); Ewald Mauritz, Weissach (DE); Stefan Tumback, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/578,471

(22) PCT Filed: Feb. 8, 2011

(86) PCT No.: PCT/EP2011/051813
§ 371 (c)(1),
(2), (4) Date: Oct. 29, 2012

(87) PCT Pub. No.: WO2011/098445
PCT Pub. Date: Aug. 18, 2011

(65) Prior Publication Data

US 2013/0036809 A1 Feb. 14, 2013

(30) Foreign Application Priority Data

Feb. 10, 2010 (DE) ........................ 10 2010 001 762

(51) Int. Cl.

| | |
|---|---|
| ***G01M 15/04*** | (2006.01) |
| ***F02N 11/08*** | (2006.01) |
| *F02D 41/00* | (2006.01) |

(52) U.S. Cl.
CPC ........ *F02N 11/0855* (2013.01); *F02D 41/0097* (2013.01)
USPC ...................................................... 73/115.05

(58) Field of Classification Search
CPC ............ F02D 41/0097; F02N 11/0855; F02N 2200/022; F02N 2200/021; F02N 2300/2008
USPC ...................................................... 73/115.05
See application file for complete search history.

(56) References Cited

U.S. PATENT DOCUMENTS 6,988,031 B2 * 1/2006 McDonald et al. ........... 701/112
7,269,499 B2 * 9/2007 Murakami et al. ............ 701/112

(Continued)

FOREIGN PATENT DOCUMENTS

DE 102006049092 3/2008
EP 1457652 9/2004

OTHER PUBLICATIONS

International Search Report for Application No. PCT/EP2011/051813 dated Sep. 13, 2011 (English Translation and Original, 4 pages).

*Primary Examiner* — Freddie Kirkland, III
(74) *Attorney, Agent, or Firm* — Michael Best & Friedrich LLP

(57) ABSTRACT

The invention relates to a method for predetermining a motion state (BZn+1) of a drive shaft (222) of an internal combustion engine (210) on the basis of previous motion states (BZn, BZn−2) of the drive shaft (222), wherein properties (tn−2, ωn−2) allocated to a first previous motion state (BZn−2) and properties (tn, ωn) allocated to a second previous motion state (BZn) are used and the drive shaft (222) assumes periodically recurring angular positions (ϕn−2, ϕn, ϕn+2; ϕn−1, ϕn+1). The invention is characterized in that a future motion state (BZn+1) and the properties (tn−1, ϕn+1) allocated thereto of the drive shaft (222) are determined in an angular position on the basis of the first evaluated previous motion state (BZn−2) and the second evaluated previous motion state (BZn), wherein the angular position (ϕn+1) of the determined future motion state (BZn+1)of the drive shaft (222) is not equal to an angular position (ϕn−2, ϕn) of the first and second previous motion state (BZn, BZn−2).

15 Claims, 5 Drawing Sheets

(56) References Cited

U.S. PATENT DOCUMENTS

| | | | | |
|---|---|---|---|---|
| 7,665,438 | B2 | 2/2010 | Hirning et al. | |
| 7,912,624 | B2 * | 3/2011 | Schafer et al. | 701/105 |
| 8,091,411 | B2 * | 1/2012 | Fulks | 73/114.26 |
| 8,099,998 | B2 * | 1/2012 | Muller | 73/114.26 |
| 8,131,452 | B2 | 3/2012 | Senda et al. | |
| 8,196,558 | B2 | 6/2012 | Okumoto et al. | |
| 2004/0149251 | A1 * | 8/2004 | Nishikawa et al. | 123/198 DB |
| 2005/0228575 | A1 | 10/2005 | Murakami et al. | |
| 2007/0044548 | A1 | 3/2007 | Ishizuka et al. | |
| 2009/0020091 | A1 | 1/2009 | Botzenhard et al. | |
| 2010/0064786 | A1 | 3/2010 | Ge et al. | |
| 2010/0282199 | A1 | 11/2010 | Heyers et al. | |
| 2011/0118962 | A1 | 5/2011 | Couetoux et al. | |
| 2011/0174255 | A1 | 7/2011 | Neuburger et al. | |
| 2011/0184626 | A1 | 7/2011 | Mauritz et al. | |
| 2011/0246050 | A1 | 10/2011 | Roessle et al. | |

* cited by examiner

METHOD FOR PREDETERMINING A MOTION STATE OF A DRIVE SHAFT OF AN INTERNAL COMBUSTION ENGINE

BACKGROUND OF THE INVENTION

The invention relates to a method for predetermining a motion state of a driveshaft of an internal combustion engine. Said method, which is performed by means of a controller for start-stop operation of an internal combustion engine in a motor vehicle, serves to realize the so-called engagement upon run-down. Engagement upon run-down means that a starting pinion of a starting device, preferably in the form of a preengaged drive starter, engages into a still-rotating toothed ring of the internal combustion engine. A still-rotating toothed ring of the internal combustion means that the standstill state, that is to say the discontinuance of rotation of the driveshaft of the internal combustion engine, is already planned, intended or has already been initiated. During said run-down, the rotational speed of the driveshaft decreases macroscopically. Considering the run-down of the driveshaft of the internal combustion engine in detail, however, it can be seen that said macroscopic run-down is characterized by relative minima and maxima and accordingly rotational speed increases and rotational speed decreases. Said rotational speed fluctuations during the macroscopic run-down have the result that the starting pinion can seldom, or not at all, be engaged into the toothed ring in such a manner as to protect the transmission. The problem here is the adaptation of the circumferential speeds, that is to say substantially the alignment of the circumferential speeds of toothed ring and starting pinion, which is difficult. Differences in the circumferential speeds have the result that the teeth of the starting pinion and toothed ring are subjected to alternating impact loading. Furthermore, an early starting of the starting pinion with high load can have the result that the starting pinion on the one hand cannot at all engage into the toothed ring, instead to some extent "ratcheting" with its teeth against the teeth of the toothed ring, and as a result the starting pinion and its teeth are subjected to considerable wear. If the starting pinion has however already been engaged slightly into the toothed ring but is already under high torque loading, there is the risk, owing to a possibly only slight degree of overlap of teeth on the toothed ring and teeth on the starting pinion, that the teeth are generally loaded only over a short distance, instead being loaded at said point with a uniform load or tooth load which is too high for said short degree of overlap. There is the risk here of teeth, or parts of said teeth, breaking away. To nevertheless permit engagement upon run-down only with low loading for the starting pinion and toothed ring, the most precise possible preparation for said mutual engagement is necessary. Within the context of said preparation, it is provided that a suitable engagement time be predicted.

Already known from the prior art are various proposals for engagement into the toothed ring during the run-down of the internal combustion engine and thus shortening of the starting time.

DE 10 2006 011 644 A1 discloses a device and a method for operating a device having a starter pinion and having a toothed ring of an internal combustion engine, wherein the rotational speed of the toothed ring and of the starter pinion are determined in order, after the shut-down of the internal combustion engine, to engage the starter pinion at substantially identical rotational speed during the run-down of the internal combustion engine. Values from a characteristic map of a control unit are assigned for determining the synchronous engagement rotational speeds.

DE 10 2006 039 112 A1 describes a method for determining the rotational speed of the starter for a motor vehicle internal combustion engine. It is also described that the starter comprises its own starter control unit for calculating the rotational speed of the starter and, during start-stop operation, accelerating the pinion of the starter initially without engagement when self-starting of the internal combustion engine is no longer possible as a result of the rotational speed having dropped. The pinion is meshed at a synchronous rotational speed into the toothed ring of the running-down internal combustion engine.

DE 10 2005 004 326 describes a starting device for an internal combustion engine with a separate engagement and starting process. For this purpose, the starting device has a control unit which activates separately a starter motor and an actuating element for engaging a starter pinion. By means of the control unit, the pinion can be engaged into the toothed ring before a starting process of the vehicle before the driver has expressed a new starting demand. Here, the actuating element, in the form of an engagement relay, is activated already during a run-down phase of the internal combustion engine. Here, the rotational speed threshold lies far below the idle rotational speed of the engine in order to keep the wear of the engagement device as low as possible. To prevent voltage drops in the on-board electrical system as a result of a very high starting current of the starter motor, a smooth start is realized by means of the controller for example through pulsing of the starter current. The power capacity of the on-board electrical system is monitored by analysis of the battery state, and the starter motor is pulsed or supplied with current correspondingly. The invention also describes that the crankshaft can be positioned shortly before or after the internal combustion engine comes to a standstill, in order to shorten the starting time.

DE 10 2005 021 227 A1 describes a starting device for an internal combustion engine in motor vehicles, having a control unit, a starter relay, a starter pinion and a starter motor for a start-stop operating strategy.

By contrast to the already known methods, it is the intention to provide a method by means of which a restart of the internal combustion engine can be carried out not only more quickly but rather also with increased precision and thus reduced wear of the starter pinion and toothed ring.

SUMMARY OF THE INVENTION

The method according to the invention permits the reliable predetermination of a motion state of a driveshaft, that is to say conventionally the crankshaft of an internal combustion engine. Here, by means of known past motion states, a future motion state of the driveshaft is determined which is not equal to an angular position of the first and of the second past motion state.

Owing to this proposed method, it is possible for all motion states to be determined from periodically recurring positions of the driveshaft which arise after the most recent past motion state. This also applies to the motion states of further periodically recurring motion states of the driveshaft.

Periodically recurring operating states are for example a range of angle of rotation between two bottom dead centers which are adjacent over the course of time or two adjacent top dead centers which are assumed in the crank drive of a driveshaft. Here, the bottom dead centers or top dead centers need not be positions of one and the same piston connected to the driveshaft or crankshaft.

In one embodiment of the invention, it is provided that, for simplification of the calculation of the method, a first past motion state and a second past motion state enclose between them an angle of rotation which corresponds in magnitude to an ignition period, at idle, between two cylinders with temporally successive ignition. Ignition normally no longer takes place during the run-down.

It is preferable for properties of a third past motion state to be used for the calculation of the future motion state of the driveshaft. This permits increased precision of the prediction. It is provided here that the third past motion state and the future motion state, which is to be determined, of the driveshaft enclose between them an angle of rotation of the driveshaft which likewise corresponds to an ignition period.

In a further embodiment of the invention, it is provided that, after the calculation of a first future motion state, a further future motion state is determined in which properties of a third past motion state are used. That is to say, taking the original first and second motion states as a starting point, the motion state of a new third motion state is used to determine the motion state of a further future motion state. The gaps between predicted motion states are smaller depending on the calculated number of future motion states, and therefore a statement can be made more effectively the more future motion states determined within an ignition period or within a corresponding angle of rotation of equal magnitude.

For the simplest possible but nevertheless precise prediction, it is provided that, in the predetermination of the motion state, it is assumed that an energy loss which arises for example as a result of permanently acting friction is constant over the course of an ignition period. It is furthermore preferably provided that there are no cylinder-dependent differences in the energy, which can be stored by gas compression, in the cylinder or the cylinders. Furthermore, it can be assumed that a mass moment of inertia of the internal combustion is constant over the course of time. By contrast to other prediction algorithms, therefore, no engine-specific basic assumptions are made regarding the run-down characteristic.

Said method proposed here is thus independent of engine aging, production-related series deviation and the change in operating parameters of the internal combustion engine. A further advantage of said method is that a speed prediction can be calculated not only on the basis of individual angular positions of the driveshaft but rather on the basis of all individual detectable angular positions of the driveshaft during the engine run-down.

Further advantages are specified where appropriate in the following description.

BRIEF DESCRIPTION OF THE DRAWINGS

The invention is explained in more detail on the basis of at least one exemplary embodiment and with reference to drawings, in which.

DETAILED DESCRIPTION

Figure 1:
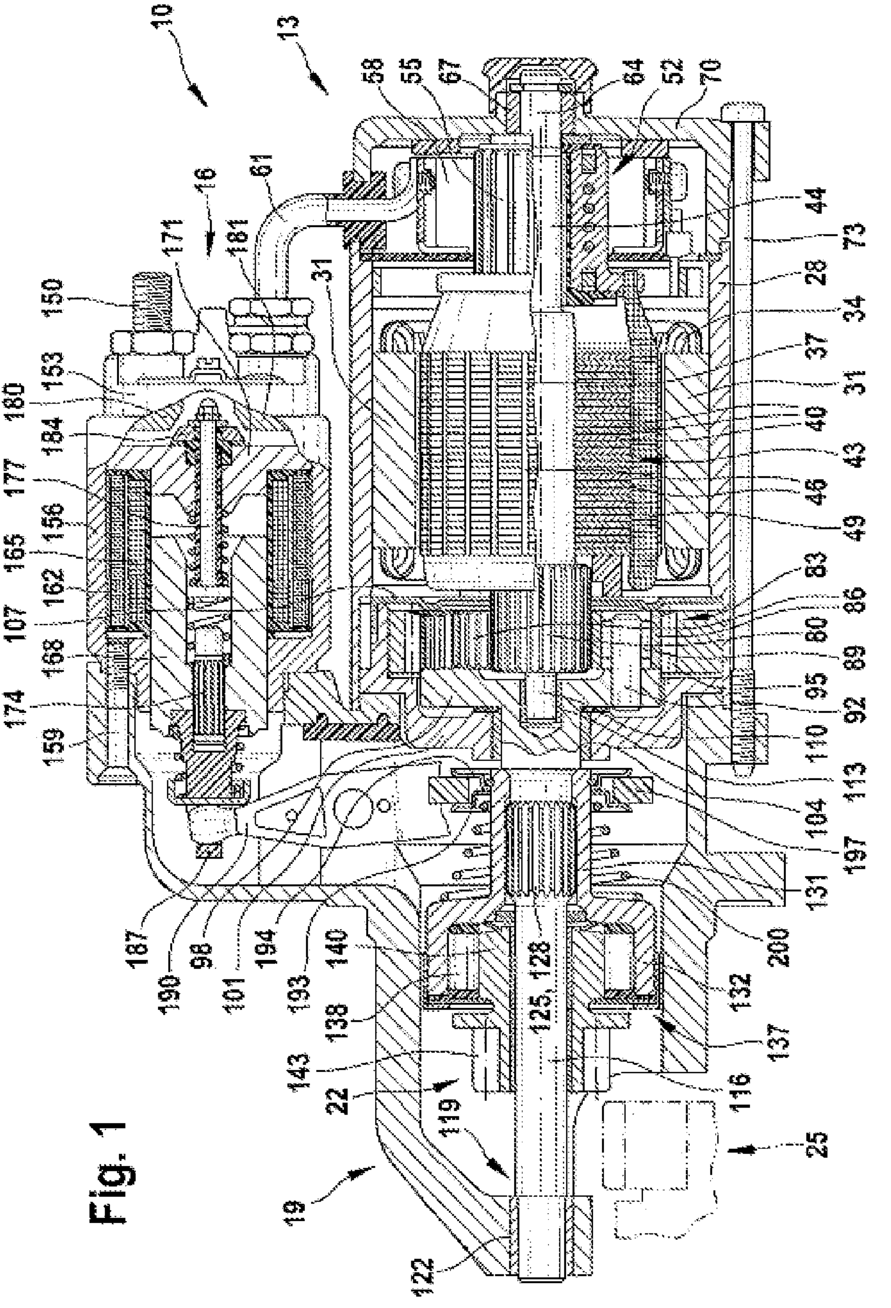
FIG. 1 shows a starting device in a longitudinal section.

FIG. 1 shows a starting device 10 in a longitudinal section. Said starting device 10 has for example a starter motor 13 and a pre-engagement actuator 16 (for example relay, starter relay). The starter motor 13 and the electric pre-engagement actuator 16 are fastened to a common drive bearing shield 19. The starter motor 13 serves functionally to drive a starting pinion 22 when it is engaged in the toothed ring 25 of the internal combustion engine (not illustrated here).

The starter motor 13 has, as a housing, a pole tube 28 which on its inner circumference bears pole shoes 31, around each of which is wound an exciter coil 34. The pole shoes 31 in turn surround an armature 37 which has an armature pack 43 constructed from plates 40 and has an armature coil 49 arranged in grooves 46. The armature pack 43 is pressed onto a driveshaft 44. On that end of the driveshaft 13 which faces away from the starter pinion 22 there is furthermore mounted a commutator 52 which is constructed inter alia from individual commutator plates 55. The commutator plates 55 are electrically connected to the armature coil 49 in a known way such that electrical energization of the commutator plates 55 via carbon brushes 58 results in a rotational movement of the armature 37 in the pole tube 28. A power supply 61 arranged between the electric drive 16 and the starter motor 13 provides electrical current, when it is activated, both to the carbon brushes 58 and also to the exciter coil 34. The driveshaft 13 is supported at the commutator side with a shaft stub 64 in a plain bearing 67, which in turn is held in a positionally fixed manner in a commutator bearing cover 70. The commutator cover 70 is in turn fastened in the drive bearing shield 19 by means of tie rods 73 which are arranged so as to be distributed over the circumference of the pole tube 28 (screws, of which there are for example two, three or four). Here, the pole tube 28 is supported on the drive bearing shield 19 and the commutator bearing cover 70 is supported on the pole tube 28.

In the drive direction, the armature 37 is adjoined by a so-called sun gear 80 which is part of a planetary gear set 83. The sun gear 80 is surrounded by a plurality of planet gears 86, normally three planet gears 37, which are supported on axle stubs 92 via rolling bearings 89. The planet gears 37 roll in an internal gear 95 which is mounted on the outside in the pole tube 28. The planet gears 37 are adjoined in the direction of the drive output side by a planet carrier 98 in which the axle stubs 92 are held. The planet carrier 98 is in turn mounted in an intermediate bearing 101 and in a plain bearing 104 arranged therein. The intermediate bearing 101 is of pot-shaped form such that both the planet carrier 98 and also the planet gears 86 are accommodated therein. Also arranged in the pot-shaped intermediate bearing 101 is the internal gear 95 which is finally closed off with respect to the armature 37 by a cover 107. The intermediate bearing 101, too, is supported with its outer circumference on the inner side of the pole tube 28. The armature 37 has, on that end of the driveshaft 13 which faces away from the commutator 52, a further shaft stub 110 which is likewise held in a plain bearing 113. The plain bearing 113 is in turn held in a central bore of the planet carrier 98. The planet carrier 98 is integrally connected to the drive output shaft 116. Said drive output shaft is supported with its end 119 facing away from the intermediate bearing 101 in a further bearing 122 which is fastened in the drive bearing shield 19.

The drive output shaft 116 is divided into different portions: the portion which is arranged in the plain bearing 104 of the intermediate bearing 101 is a portion with a so-called straight toothing 125 (internal toothing) which is part of a so-called shaft-hub connection. In this case, said shaft-hub connection 128 permits axially rectilinear sliding of a driver 131. Said driver 131 is a sleeve-like projection which is integrally connected to a pot-shaped outer ring 132 of the freewheel 137. Said freewheel 137 (ratchet) is furthermore composed of the inner ring 140 which is arranged radially within the outer ring 132. Between the inner ring 140 and the outer ring 132 there are arranged clamping bodies 138. Said clamping bodies 138, in interaction with the inner ring and outer ring, prevent a relative rotation between the outer ring and the inner ring in a second direction. In other words: the freewheel 137 permits a rotational relative movement between the inner ring 140 and outer ring 134 only in one direction. In this exemplary embodiment, the inner ring 140 is formed in one piece with the starting pinion 22 and the helical toothing 143 (external helical toothing) thereof. The starting pinion 22 may also alternatively be in the form of a straight-toothed pinion. Permanent-magnet-excited poles could also be used instead of electromagnetically excited pole shoes 31 with exciter coils 34.

The electric pre-engagement actuator 16 or the armature 168 however also has the additional task of moving, by means of a tension element 187, a lever which is arranged in a rotationally movable manner in the drive bearing shield 19. Said lever 190, normally in the form of a forked lever, engages with two “prongs” (not illustrated here) at its outer circumference around two disks 193 and 194 in order to move a driver ring 197, which is clamped between said disks, in the direction of a freewheel 137 counter to the resistance of the spring 200, and thereby engage the starting pinion 22 in the toothed ring 25.

The engagement mechanism will be discussed below. The electric pre-engagement actuator 16 has a bolt 150 which is an electrical contact and which, in an installed state in the vehicle, is connected to the positive terminal of an electric starter battery (not illustrated here). Said bolt 150 is guided through a cover 153. A second bolt 152 is a terminal for the electric starter motor 13, to which a supply is provided via the power supply 61 (thick cable). Said cover 153 closes off a housing 156 which is fastened to the drive bearing shield 19 by means of a plurality of fastening elements 159 (screws). In the electric pre-engagement actuator 16 there is arranged a thrust device 160 for exerting a tensile force on the fork lever 190 and a switching device 161. The thrust device 160 has a coil 162 and the switching device 161 has a coil 165. The coil 162 of the thrust device 160 and the coil 165 of the switching device 161, in each case in the activated state, generate an electromagnetic field which flows through various components. The shaft-hub connection 128 may also be provided with a straight toothing 125. Here, combinations are possible in which a) the starting pinion 22 is helically toothed and the shaft-hub connection 128 has a straight-toothing 125, b) the starting pinion 22 is helically toothed and the shaft-hub connection 128 has a steep-thread toothing, or c) the starting pinion 22 is straight-toothed and the shaft-hub connection 128 has a steep-thread toothing.

Figure 2:
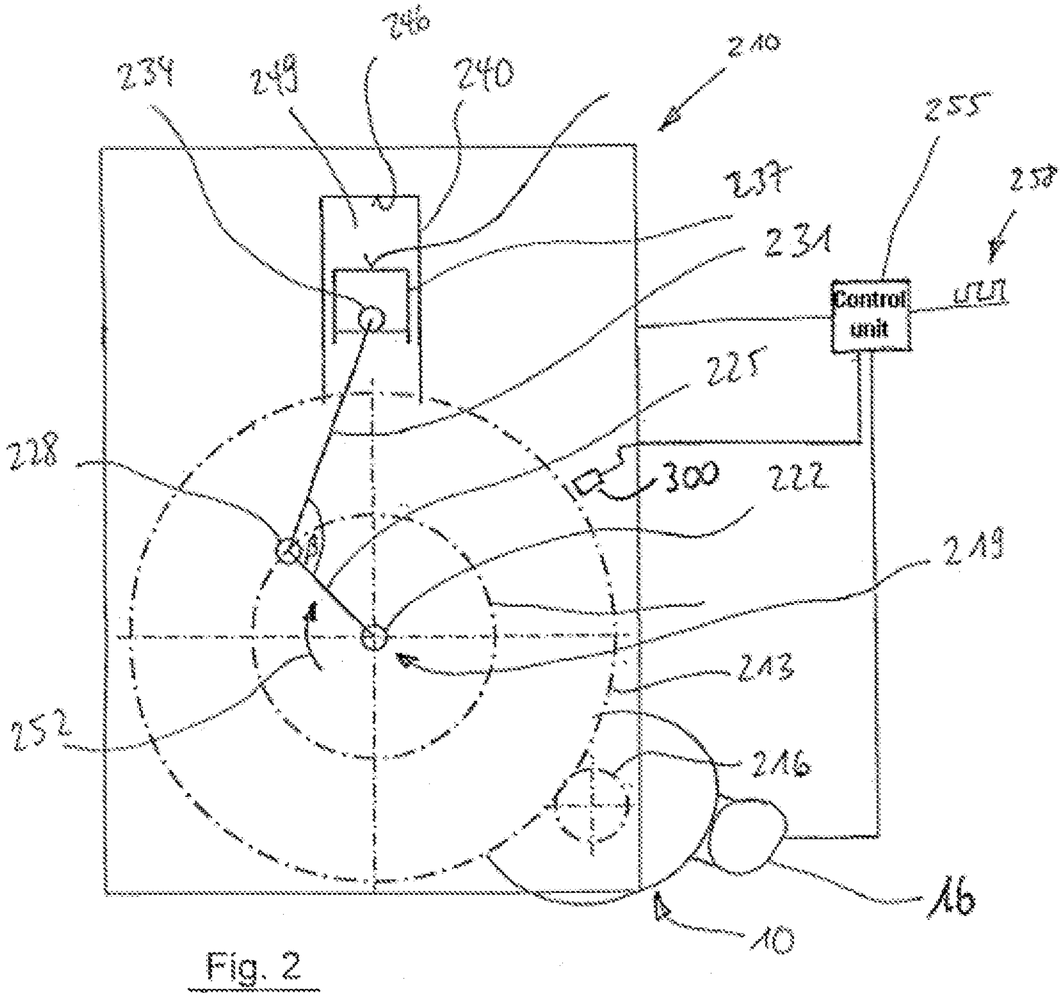
FIG. 2 shows a schematic illustration of a crank drive of an internal combustion engine.

FIG. 2 illustrates a schematic view of an internal combustion engine 210. Said internal combustion engine 210 has the above-mentioned toothed ring 25, of which a so-called pitch circle 213 is illustrated in FIG. 2. Said pitch circle 213 is tangent to a further pitch circle 216. While the pitch circle 213 is the pitch circle 213 of a toothing of the toothed ring 25, the pitch circle 216 is the pitch circle of the toothing of the starting pinion 22. Here, the pitch circle 216 is not part of the internal combustion engine 210, but is illustrated here for clarity and for understanding. An axis of rotation 219 of a driveshaft 222 of the internal combustion engine 210 is illustrated at a center of rotation which is illustrated here by two intersecting dash-dotted lines. Said driveshaft 222 is in this case in the form of a so-called crankshaft. From a central part, which moves purely in rotation, of the driveshaft 222 there extends a crank part 225 or crank portion. A connecting rod 231 is articulatedly connected to a crank pin 228. While one end of the connecting rod 231 is articulatedly connected to the crank pin 228, another end of the connecting rod 231 is articulatedly connected by means of a piston pin 234 to a piston 237. Said piston 237 in turn is arranged such that it can slide linearly in a cylinder 240. Between a piston crown 243 and a surface 246 of a cylinder head (not described in any more detail) there is situated a combustion chamber 249. Depending on the embodiment of the internal combustion engine 210, a plurality of connecting rods 231 and therefore also a plurality of pistons 237 may be articulatedly connected to the driveshaft 222 (multi-cylinder engine or internal combustion engine). The arrow 252 shown in FIG. 2 indicates a direction of rotation of the drive shaft 222 in the driving state of the internal combustion engine 210.

An internal combustion engine 210 of said type is conventionally controlled by a control unit 255. If said control unit 255 now receives a signal 258 which informs the control unit 255 that the internal combustion engine 210 should be shut down, it is for example the case that a fuel supply (not illustrated here) is interrupted in order that the internal combustion engine 210 comes to a standstill after a short time. Such a run-down 261 is illustrated in more detail in FIG. 3.

Figure 3:
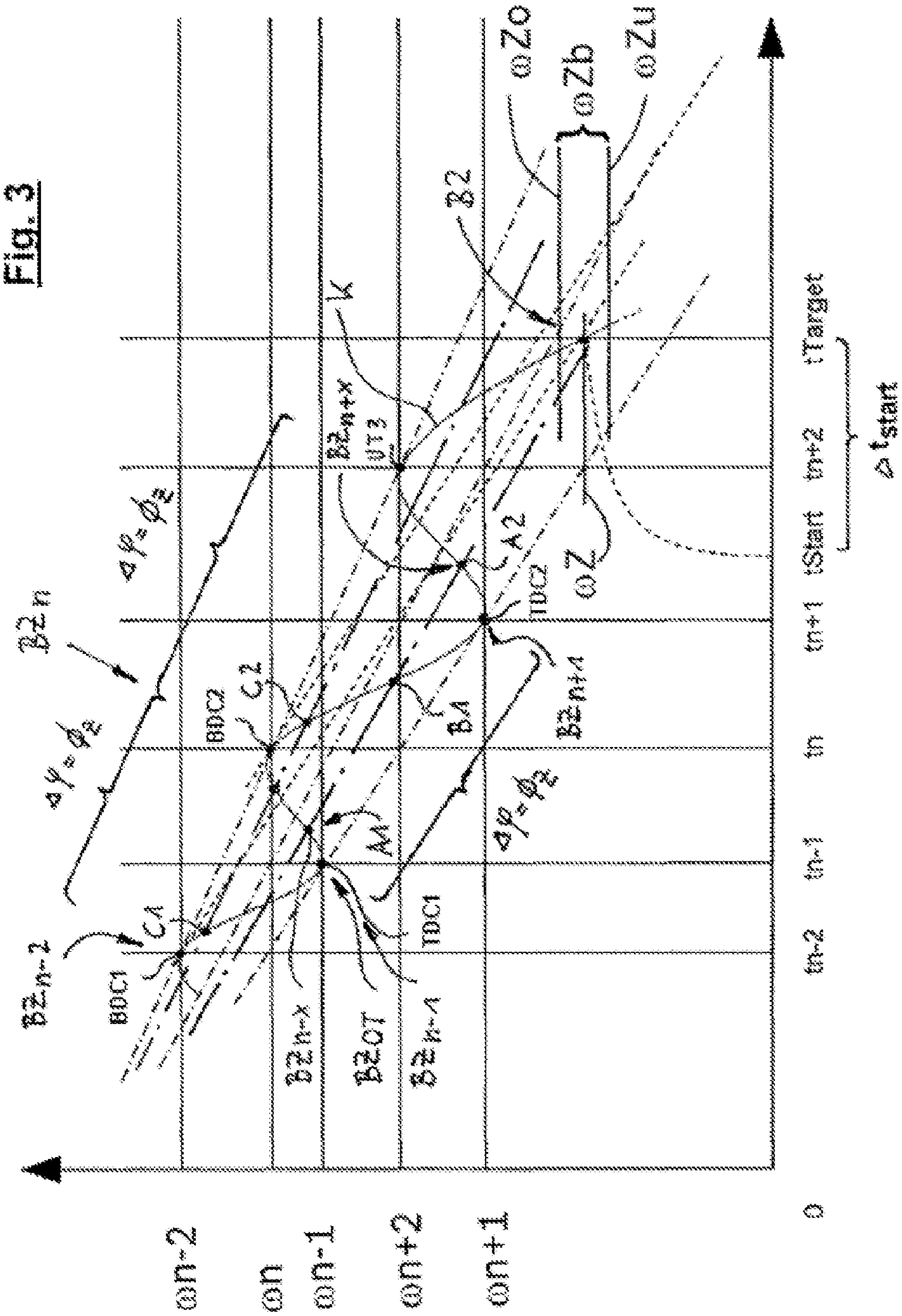
FIG. 3 shows a schematic detail of a run-down of an internal combustion engine.

FIG. 3 illustrates, by way of example and in the form of a detail, a curve k which represents a run-down of an internal combustion engine 210. Said curve k has a plurality of characteristic points. Said points include the three relative maxima denoted by BDC1, BDC2 and BDC3. Two further prominent points are the two relative minima denoted by TDC1 and TDC2. The abbreviation BDC stands for “bottom dead center” and the abbreviation TDC stands for “top dead center”. In conjunction with FIG. 2, a bottom dead center 1 is present if an angle β between the connecting rod 231 and the crank part 225 is exactly 0 degrees. If a piston 237 is situated in a so-called top dead center, then angle β is equal to 180°. The positions of BDC and TDC are assumed, only for this example, to be at the positions of the maxima and minima. In fact, a BDC and also a TDC may be situated adjacent to a maximum or a minimum. The respective actual position is dependent for example on valve control times, compression states and other influences. The latter include for example also the influence of the load generated at the generator if the latter is coupled, as is conventional, via a belt drive to the internal combustion engine 210. As illustrated in FIG. 3, the motion state of the driveshaft 222 BZn−2 is present at the bottom dead center BDC1, the motion state BZn is present at the bottom dead center BDC2, the motion state BZn+2 is present at BDC3, the motion state BZn−1 is present at the top dead center 1, and the motion state BZn+1 is present at the top dead center TDC2. The individual motion states are assigned the respective times tn−2, tn−1, tn+1 and tn+2 and the angular speeds ωn−2, ωn−1, ωn, ωn+1 and ωn+2, which are assigned to the respective motion state BZ, of the driveshaft 222. Also included in FIG. 3 are three labels which render more precisely an angular interval between the bottom dead centers BDC1 and BDC2, and BDC2 and BDC3, and also an angular interval between the bottom dead centers BDC1 and BDC2. Here, the angle Z corresponds, in the crank drive of the internal combustion engine 210, to an angular interval between two top dead centers TDC which are adjacent in the time profile and at which in theory an ignition would be provided if the internal combustion engine 210 were not in the run-down phase in said range. In other words: the top dead center TDC1 which is assumed here is a top dead center at which a compression of the gas situated in the combustion chamber 249 takes place. The same state is present at the top dead center TDC2, at which likewise a piston 237 compresses gas in the combustion chamber 249. In the case of a conventional 4-cylinder in-line engine, said ignition interval Z in quasi-steady-state operation is exactly 180°. In the case of a six-cylinder in-line engine, said angle Z would be 120°. As can be seen, the illustration in FIG. 3 is universal in this respect. The bottom dead centers BDC1, BDC2 and BDC3 illustrated in FIG. 3 are accordingly bottom dead centers at which pistons 237 are specifically in the first part of the gas exchange process (discharge of the combustion gases).

The method for predetermining a motion state BZn+1 of the driveshaft 222 of the internal combustion engine 210 preferably determines the motion state BZn−2, and thus a first past motion state, once it is known to the system (vehicle, internal combustion engine, controller of the internal combustion engine) that the internal combustion engine 210 has been shut down or should be shut down. This also includes the properties associated with said first past motion state BZn−2, that is to say a time tn−2 and also an angular speed ωn−2, being determined. While the determination of the time tn−2 may be for example simply any desired point in time of the system, that is to say a time which started running considerably before the shut-down of the internal combustion engine 201, or for example is a time which started running upon a signal which is identical to a shut-down signal of the internal combustion engine 201, or actually to said time tn−2 at which the properties, which are then to be queried or calculated, at the special angle position (ϕn−2 starts running Another property of said motion state BZn−2 is the angular speed ωn−2 present at said time tn−2. Here, there are two possibilities for the determination thereof:

A first possibility consists in gathering from the system an actually known angular speed which prevails at said moment tn−2.

A second possibility consists in calculating the angular speed ωn−2 prevailing at said time tn−2. Said calculation of the angular speed ωn−2 may be realized for example by virtue of a certain sensor signal being evaluated. As indicated in FIG. 2, the system has a rotational speed sensor 300 which detects for example a rotational movement of the toothed ring 25 or the rotational movement, directly linked thereto, of an encoder wheel or encoder contour. Said signal which is generated by said rotational speed sensor is for example transmitted to the control unit 255. Said time-variable signal is assigned to the corresponding times, such that by means of the time variation Δt and the type of signal delivered by the rotational speed sensor 300, the calculation of the angular speed ωn−2 in the operating state BZn−2 is made possible. As in the case of said motion state BZn−2, the motion state BZn, which is still in the future at the time tn−2, and the properties thereof are determined. This takes place once the driveshaft 222, proceeding from the driveshaft position ϕn−2 in the motion state BZn−2, has additionally run through an angle of rotation Δϕ so as to assume the motion state BZn. Said motion state at the time to with the angular speed ωn is calculated or determined analogously to the motion state BZn−2 and the properties assigned thereto.

Proceeding from the two past motion states BZn−2 and BZn, it is provided that a future motion state BZn+1 is calculated and therefore the properties tn+1 and ωn+1 are determined mathematically. Said future motion state BZn+1 has a rotational angle difference in relation to a further past motion state BZn−1, which rotational angle difference corresponds in magnitude to a rotational angle interval of Δϕ, which is the same size as an ignition period Z. In FIG. 3, said two points or intervals BZn+1 are present at a top dead center TDC2 and the motion state BZn−1, which lies in the past in relation thereto by an ignition period Z, is likewise present at a top dead center, in this case TDC1. The motion state BZn+1 to be evaluated could equally be displaced by 60° after the top dead center TDC2 to the point A2. The corresponding point or motion state in the past would then be seen at the point A1, which is likewise situated 60° after TDC1. It is pointed out at this juncture that the two past first and second motion states may for example lie 60° after a top dead center, see also the corresponding points C1 and C2 in FIG. 3. Taking said situation as a starting point, the further procedure is as follows:

The first past motion state BZn−2 can be described for example by the angular speed ωn−2, the present driveshaft angle ϕn−2, and the time tn−2 at which the first past motion state BZn−2 is present. Furthermore, the energetic state of the motion state BZn−2 can be specified. The overall energy En−2 is $$E_{n-2} = \frac{1}{2} J\omega_{n-2}^2 + E_{komp,n-2}, \qquad \text{(Eq. 1)}$$

wherein the first summand denotes the rotational energy and the second summand denotes the potential energy stored by the gas compression.

The second past motion state BZn can be described for example by the angular speed ωn, the present driveshaft angle ϕn, and the time to at which the second past motion state BZn is present. Furthermore, it is possible here, too, for the motion state BZn to be specified. The overall energy En is $$E_n = \frac{1}{2} J\omega_n^2 + E_{komp,n}, \qquad \text{(Eq. 2)}$$

wherein the first summand again denotes the rotational energy and the second summand denotes the potential energy stored by the gas compression.

For the future motion state BZn+1, it is possible from experience to specify for example the angular speed ωn+1, the present driveshaft angle ϕn+1, and the time tn+1 at which the future motion state BZn+1 should be present. Furthermore, it is possible here, too, for the energetic state of the motion state BZn+1 to be specified. The overall energy En+1 is $$E_{n+1} = \frac{1}{2} J\omega_{n+1}^2 + E_{komp,n+1}, \qquad \text{(Eq. 3)}$$

wherein the first summand again denotes the rotational energy and the second summand denotes the potential energy stored by the gas compression.

For the motion state BZn−1, in this case for example between the motion states BZn−2 and BZn, it is possible from experience to specify for example the angular speed ωn−1, the present driveshaft angle ϕn−1 and the time tn−1. Furthermore, it is possible here, too, for the energetic state of the motion state BZn−1 to be specified. The overall energy En−1 is $$E_{n-1} = \frac{1}{2}J\omega_{n-1}^2 + E_{komp,n-1}, \quad \text{(Eq. 4)}$$

wherein the first summand again denotes the rotational energy and the second summand denotes the potential energy stored by the gas compression in the motion state BZn−1.

Furthermore, it should be the case that the energy state present in the motion state BZn+1 can be described by the following equation:

$$E_{n+1}=E_{n-1}-E_{Reib}(\omega_{n+1}-\omega_{n-1}). \quad \text{(Eq. 5)}$$

The energy state En+1 thus corresponds to the energy state En−1 minus the energy loss EReib by which the energy state En−1 differs from the energy state En+1. The summand $$E_{Reib}(\omega_{n+1}-\omega_{n-1}) \quad \text{(Eq. 6)}$$

describes the energy loss EReib generated between the two motion states BZn+1 and BZn−1.

Furthermore, it should be the case that the energy state present in the motion state BZn can be described by the following equation:

$$E_n=E_{n-2}-E_{Reib}(\omega_n-\omega_{n-2}). \quad \text{(Eq. 7)}$$

The energy state En thus corresponds to the energy state En−2 minus the energy loss EReib by which the energy state En differs from the energy state En−2. The summand $$E_{Reib}(\omega_n-\omega_{n-1}) \quad \text{(Eq. 8)}$$

describes the energy loss EReib generated between the two motion states BZn−2 and BZn.

It is also provided as a condition that the respective energy losses are equal, that is to say $$E_{Reib}(\omega_n-\omega_{n-2})=E_{Reib}(\omega_{n+1}-\omega_{n-1})=E_{Reib}(\omega_{n+2}-\omega_n)=E_{Reib}. \quad \text{(Eq. 9)}$$

As a further condition, it should be the case that the compression energies at positions of the driveshaft (222) which are spaced apart precisely one ignition period are equal. Accordingly, the following applies:

$$E_{komp,n}=E_{komp,n-2} \quad \text{(Eq. 10)}$$

and $$E_{komp,n+1}=E_{komp,n-1}. \quad \text{(Eq. 11)}$$

If equation 3 is rearranged for ωn+1 and solved by means of the above equations, ωn+1 emerges as $$\omega_{n+1}=\sqrt{\omega_n^2-\omega_{n-2}^2+\omega_{n-1}^2}. \quad \text{(Eq. 12)}$$

Here, the calculation process for determining the angular speed is independent of the position of the points being considered.

For calculation of the time tn+1, the equation 13 is firstly formulated analogously to equation 2:

$$E_{n+2} = \frac{1}{2}J\omega_{n+2}^2 + E_{komp,n+2}, \quad \text{(Eq. 13)}$$

and rearranging this for ωn+2 yields equation 14, $$\omega_{n+2} = \sqrt{\frac{2}{J}(E_{n+2} - E_{komp,n+2})}\,. \quad \text{(Eq. 14)}$$

If, for the energy state En+2, an equation eq. 15 is established analogously to eq. 5, then eq. 15 emerges as follows:

$$E_{n+2}=E_n-E_{Reib}(\omega_{n+2}-\omega_n). \quad \text{(Eq. 15)}$$

Using En+2 from eq. 15 and En from eq. 2, and under the assumption that the compression and loss components Ekomp,n+2 and Ekomp,n are equal, and taking into consideration the square of equation 12, the relationship as per eq. 16 emerges:

$$\omega_{n+2}=\sqrt{2\omega_n^2-\omega_{n-2}^2}. \quad \text{(Eq. 16)}$$

Figure 4:
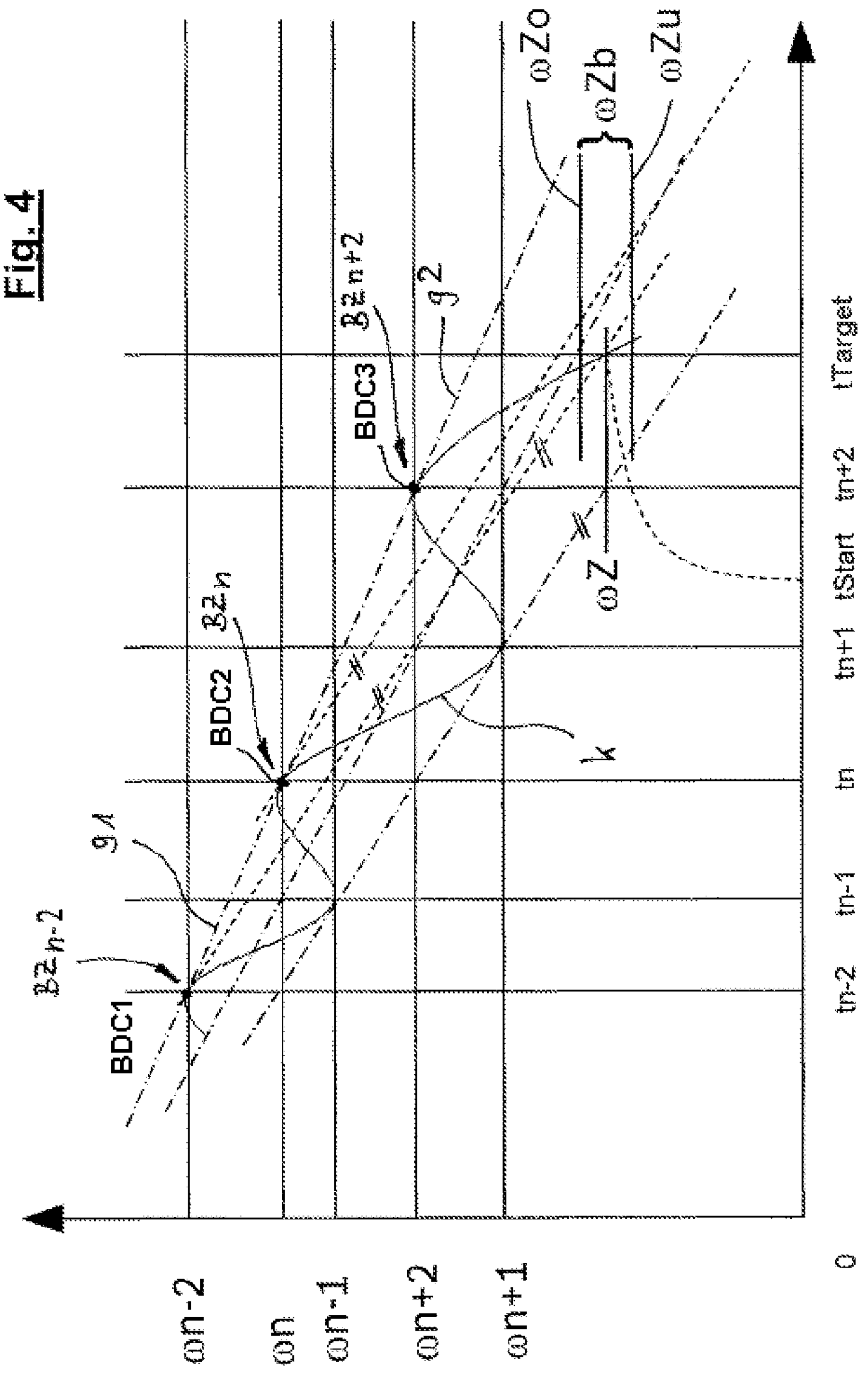
FIG. 4 shows the detail from FIG. 3 with various auxiliary lines.

The time tn+2 is calculated by means of the assumption, see also FIG. 4, that the gradient of a line of best fit g1 between the two points at BZn−2 and BZn is equal to the gradient of a line of best fit g2 between the two points at BZn−2 and BZn. Consequently, the lines of best fit g1 and g2 are formed by the line of best fit g, which runs through the points BDC1, BDC2 and BDC3. A gradient m of said line of best fit g can thus be described by equation 17, $$m = \frac{\omega_n - \omega_{n-2}}{t_n - t_{n-2}} = \frac{\omega_{n+2} - \omega_n}{t_{n+2} - t_n}. \quad \text{(Eq. 17)}$$

tn+2 thus emerges from the rearrangement of equation 17 to $$t_{n+2} = \frac{\omega_{n+2} - \omega_n}{\omega_n - \omega_{n-2}}(t_n - t_{n-2}) + t_n. \quad \text{(Eq. 18)}$$

Based on the assumptions for the constant decrease in energy between two adjacent bottom dead centers and/or between a first and a second past motion state BZn−2 and BZn, the relationship according to equation 19 emerges from FIG. 4:

$$\frac{t_{n-1} - t_{n-2}}{t_n - t_{n-2}} = \frac{t_{n+1} - t_n}{t_{n+2} - t_n}. \quad \text{(Eq. 19)}$$

The insertion of equation 18 into equation 19 yields the relationship according to equation 20:

$$t_{n+1} = (t_{n-1} - t_{n-2})\frac{(\omega_{n+2} - \omega_n)}{(\omega_n - \omega_{n-2})} + t_n. \quad \text{(Eq. 20)}$$

With equation 16, equation 21 is thus attained for tn+1:

$$t_{n+1} = (t_{n-1} - t_{n-2})\frac{\left(\sqrt{2\omega_n^2 - \omega_{n-2}^2} - \omega_n\right)}{(\omega_n - \omega_{n-2})} + t_n. \quad \text{(Eq. 21)}$$

The above steps thus yield, for the motion state BZn+1, both the angular speed ωn+1 of the driveshaft 222 (equation 12) and also the time tn+1 at which the angular speed ωn+1 is present (equation 21).

Said process can also be applied directly to the past motion states BZn−2 and BZn in C1 and C2 and A1 in order to determine the motion state in A2.

From that stated above, there is thus disclosed a method for predetermining a motion state BZn+1 of a driveshaft 222 of an internal combustion engine 210 on the basis of past motion states BZn, BZn−2 of the driveshaft 222, wherein properties tn−2, ωn−2 assigned to a first past motion state BZn−2 and properties tn, ωn assigned to a second past motion state BZn are used for this purpose and the driveshaft 222 assumes periodically recurring angular positions ϕn−2, ϕn, ϕn+2; ϕn−1, ϕn+1. The method furthermore has steps in which, by means of the first evaluated motion state BZn−2 and the second evaluated past motion state BZn, a future motion state BZn+1 and the properties tn+1, ϕn+1, assigned thereto, of the driveshaft 222 at an angular position ϕn+1 are determined, wherein the angular position ϕn+1 of the determined future motion state BZn+1 of the drive shaft 222 is not equal to an angular position ϕn−2, ϕn of the first and of the second past motion state BZn, BZn−2.

It is provided here that the first past motion state BZn−2 and the second past motion state BZn enclose between them an angle of rotation Δϕ of the driveshaft 222 which corresponds in magnitude to an ignition period Z.

Properties tn−1, ωn−1 of a third past motion state BZn−1 are used for the calculation of the future motion state BZn+1 of the driveshaft 222.

The third past motion state BZn−1 and the future motion state BZn+1, which is to be determined, of the driveshaft 222 enclose between them an angle of rotation Δϕ of the driveshaft 222 which corresponds to an ignition period Z.

After the calculation of a first future motion state BZn+1, a further future motion state BZn+x is determined in which properties tn+x, ϕn+x of a further third past motion state BZn−x are used.

The further third past motion state BZn−x and the further future motion state BZn+x enclose between them an angle of rotation Δϕ of the driveshaft 222 which corresponds to an ignition period Z.

In the predetermination of a motion state BZn+1, it is assumed that an energy loss EReib is constant over the course of an angle of rotation Δϕ of the driveshaft. Furthermore, in the predetermination of a motion state BZn+1, it is assumed that compression energy Ekomp,n−2, Ekomp,n−1, Ekomp,n, Ekomp,n+1 stored in the internal combustion engine 210 is assumed to be equal at different angular positions ϕn−2, ϕn ϕn, ϕn+1 of the driveshaft 222, wherein the different angular positions ϕn−2 and ϕn, ϕn, ϕn+1 and also ϕn−1 and ϕn+1 are spaced apart by an angle of rotation Δϕ which corresponds to an integer multiple V of an ignition period Z, wherein the multiple is at least 1.

In the predetermination of a motion state BZn+1, it is assumed that a moment of inertia J of the driveshaft 222 and of the movable parts operatively connected thereto, such as connecting rods 231, pistons 237 and parts which are not illustrated such as for example camshafts, a generator, and one or more belt drives which are connected to the driveshaft 222, is constant over a swept angle ϕ or angle range or angle of rotation Δϕ.

The first past motion state BZn−2 and the second past motion state BZn enclose between them a motion state BzTDC in which a piston 237 which is connected to the driveshaft 222 is situated in a position corresponding to top dead center TDC.

In the method, it is provided that the energetic state of a motion state BZn−2, BZn−1, BZn, BZn+1, BZn+2, BZn+x, BZn−x, . . . of the driveshaft 222 and of the moving parts operatively connected thereto is at any moment a sum of kinetic energy and compression energy.

An energy difference between two different angle positions, for example between ϕn−2 and ϕn or ϕn−1 and ϕn+1, which are spaced apart by an angle of rotation Δϕ corresponding to an ignition period Z. corresponds to an energy loss EReib.

Different motion states BZn−2, BZn and also BZn+2 BZn−1 and BZn+1 form in each case a group, wherein within a group, two directly adjacent motion states such as BZn−2 and BZn or BZn and BZn+2 or BZn−1 and BZn+1 enclose between them an angle of rotation Δϕ which corresponds to an ignition period Z. Between in each case two such directly adjacent motion states such as BZn−2 and BZn or BZn and BZn+2 or BZn−1 and BZn+1, it should be the case that a quotient m of an angular speed difference and a time difference is constant.

Within the context of said method proposed here, it is provided that an angular speed ωZ suitable for the engagement of a starting pinion 22 into a toothed ring 25 is determined, which angular speed is if appropriate situated in an angular speed range ωZb suitable for the engagement of a starting pinion 22, and that, if one of the plurality of predetermined motion states BZn+x, denoted in this case in FIG. 3 for example by B2, attains the suitable angular speed, be it in the form of a special target angular speed ωZ or a special target angular speed range ωZb with a maximum admissible target angular speed ωZo and a minimum admissible target angular speed ωZu, a time (tStart) is calculated at which a starting device 10 commences pre-engagement with its starting pinion 22. For this purpose, the calculated target time tTarget at which an engagement of the starting pinion 22 into the toothed ring 25 is expected has subtracted from it a starter-specific engagement time ΔtStart in order to determine the thereby calculated start time tStart.

Figure 5:
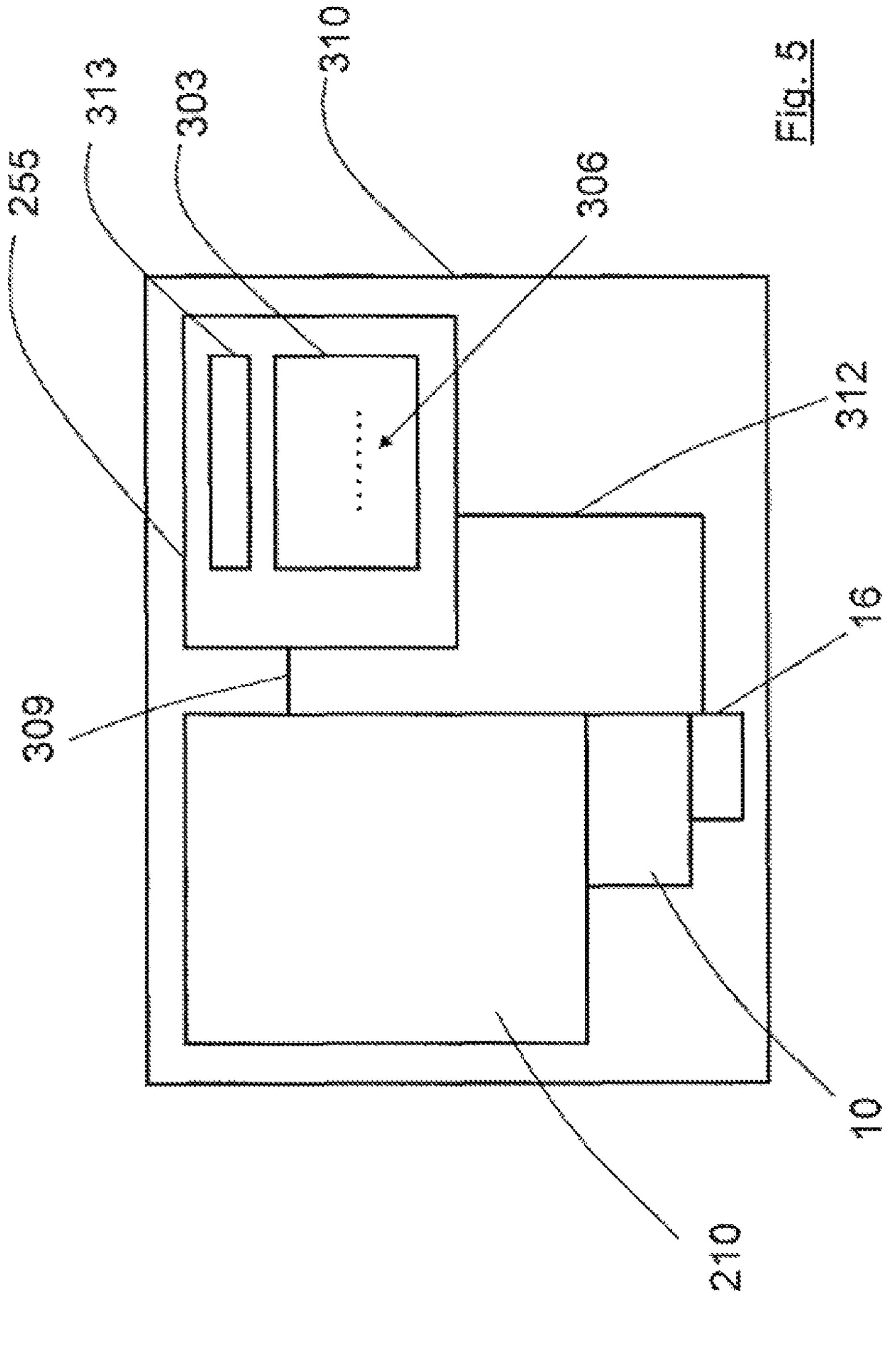
FIG. 5 shows a schematic illustration of a motor vehicle having internal combustion engine, starting device and further components.

For an overview, FIG. 5 shows a schematic illustration of a motor vehicle 310 having the internal combustion engine 210, the starting device 10, the pre-engagement actuator 16, a control unit 255 with a processor 313 and a program memory 303. In the program memory 303 there are stored systematically linked program commands 306 (computer program product) which permit an execution of the method, described here, according to one of the embodiments described here. The control unit is connected to the internal combustion engine 210 by means of a connecting device 309 (for example a cable) which permits for example the transmission of signals from the rotational speed sensor 300 to the control unit 255. A connecting device 312 serves for activating the pre-engagement actuator 16 after a suitable start time tStart has been determined.

The program commands 306 (computer program product) can be loaded into the program memory 303 for example via an interface (for example plug connection).

A computer program product is thus disclosed which can be loaded into at least one program memory 303 with program commands 306 in order to permit an execution of all of the steps of the method according to one of the embodiments described here if the program is executed in at least one control unit 255.

FIG. 5 shows a control unit 255 for start-stop operation of an internal combustion engine 210 in a motor vehicle 310 for rapid stopping and starting of the internal combustion engine 210, wherein the internal combustion engine 210 can be started by means of an electric starting device 10, wherein the control unit 255 has a processor 313 with a program memory 303. The processor 313 is formed as a measurement, evaluation and control device for activating the starting device 10 in a defined manner, wherein a computer program product as mentioned above is loaded into the program memory 303 in order to execute the method according to one of the above-described steps.

The methods specified here can be applied inter alia to three-cylinder in-line engines with an ignition interval Z=240°, four-cylinder in-line engines with an ignition interval Z=180°, boxer engines with two, four, six, eight and more cylinders (even number of cylinders) and with an ignition interval Z=180°, five-cylinder in-line engines with an ignition interval Z=144°, six-cylinder in-line engines with an ignition interval Z=120°, six-cylinder, eight-cylinder and twelve-cylinder V-configuration engines with an ignition interval of Z=120° (six-cylinder), an ignition interval of Z=90° (eight-cylinder) and an ignition interval of Z=60° (twelve-cylinder).

It is provided that the above-described method steps be used in a motor vehicle which is equipped with a start-stop operating mode. The start-stop operating mode permits an automated engagement of the starting pinion 22 when the control unit 255 receives from a triggering device 319 a signal 316 which represents a demand of the vehicle driver to resume travel with the motor vehicle. The triggering device 319 may be a so-called clutch pedal or an accelerator pedal or a shift control part which, in the case of shift transmissions (traction gearbox between clutch and drive wheel or wheels), serves for selecting a step-up or step-down transmission ratio.

The invention claimed is:

1. A method for determining a motion state of a driveshaft of an internal combustion engine on the basis of past motion states of the driveshaft, the driveshaft assuming periodically recurring angular positions, the method comprising:

assigning properties to a first past motion state;

assigning properties to a second past motion state;

determining a future motion state of the driveshaft at an angular position based on the first past motion state and the second past motion state, wherein the angular position of the future motion state of the drive-shaft is not equal to angular positions of the first and of the second past motion states;

determining an angular speed of the driveshaft suitable for the engagement of a starting pinion into a toothed ring, and calculating a time at which a starting device commences pre-engagement with its starting pinion if a predetermined motion state has the suitable angular speed.

2. The method as claimed in claim 1, wherein the first past motion state and the second past motion state enclose between them an angle of rotation of the driveshaft which corresponds in magnitude to an ignition period.

3. The method as claimed in claim 1, wherein properties of a third past motion state are used for the determination of the future motion state of the driveshaft.

4. The method as claimed in claim 3, the third past motion state and the future motion state enclose between them an angle of rotation of the driveshaft which corresponds to an ignition period.

5. The method as claimed in claim 4, wherein after the determination of the future motion state, a second future motion state is determined in which properties of a fourth past motion state are used.

6. The method as claimed in claim 5, wherein the fourth past motion state and the second future motion state enclose between them an angle of rotation of the driveshaft which corresponds to an ignition period.

7. The method as claimed in claim 6, wherein, in the determination of the future motion state, it is assumed that an energy loss is constant over the course of an angle of rotation of the driveshaft.

8. The method as claimed in claim 6, wherein, in the determination of a the future motion state, it is assumed that compression energy stored in the internal combustion engine is equal at different angular positions of the driveshaft, wherein the different angular positions are spaced apart by an angle of rotation which corresponds to an integer multiple of an ignition period, wherein the multiple is at least 1.

9. The method as claimed in claim 1, wherein, in the determination of the future motion state, it is assumed that a moment of inertia of the driveshaft and of the movable parts operatively connected thereto is constant over a swept angle.

10. The method as claimed in claim 1, wherein the first past motion state and the second past motion state enclose between them a motion state in which a piston which is connected to the driveshaft is situated in a position corresponding to top dead center.

11. The method as claimed in claim 1, characterized in that an energetic state of a motion state is at any moment a sum of kinetic energy and compression energy.

12. The method as claimed in claim 1, wherein an energy difference between two different angular positions which are spaced apart by an angle of rotation corresponding to an ignition period, corresponds to an energy loss.

13. The method as claimed in claim 1, wherein different motion states form in each case a group, wherein within a group, two directly adjacent motion states enclose between them an angle of rotation which corresponds to an ignition period, and between in each case two such directly adjacent motion states, a quotient of an angular speed difference and a time difference is constant.

14. A non-transitory computer program product loaded into at least one program memory with program commands for executing by a control unit all of the steps of the method as claimed in claim 1.

15. A control unit for start-stop operation of an internal combustion engine in a motor vehicle for rapid stopping and starting of the internal combustion engine, wherein the internal combustion engine can be started by means of an electric starting device, wherein the control unit has a processor with a program memory, characterized in that the processor is formed as a measurement, evaluation and control device for activating the starting device in a defined manner, wherein a computer program product as claimed in claim 14 is loaded into the program memory (303) in order to execute the method.

* * * * *